US011889280B2

(12) United States Patent
Lesso

(10) Patent No.: US 11,889,280 B2
(45) Date of Patent: Jan. 30, 2024

(54) FILTERS AND FILTER CHAINS

(71) Applicant: Cirrus Logic International Semiconductor Ltd., Edinburgh (GB)

(72) Inventor: John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 63 days.

(21) Appl. No.: 17/749,603

(22) Filed: May 20, 2022

(65) Prior Publication Data

US 2023/0107777 A1 Apr. 6, 2023

Related U.S. Application Data

(60) Provisional application No. 63/252,291, filed on Oct. 5, 2021.

(51) Int. Cl.
*H04R 3/04* (2006.01)
*H04R 1/32* (2006.01)

(52) U.S. Cl.
CPC *H04R 3/04* (2013.01); *H04R 1/32* (2013.01)

(58) Field of Classification Search
CPC ........ H04R 3/04; H04R 2430/03; H04R 1/32; H04R 1/323; H03H 17/0294; H03H 17/0219; H03H 17/0264; H04S 7/307
USPC .................. 381/97, 98, 94.2, 94.3, 316, 320
See application file for complete search history.

(56) References Cited

U.S. PATENT DOCUMENTS

| | | | | |
|---|---|---|---|---|
| 8,315,859 | B2 * | 11/2012 | Villemoes | H03H 17/0294 704/203 |
| 10,115,410 | B2 * | 10/2018 | Craven | G10L 21/038 |
| 2012/0195442 | A1 * | 8/2012 | Villemoes | G10L 19/0204 381/98 |
| 2013/0089215 | A1 * | 4/2013 | Kon | H04R 3/04 381/74 |
| 2016/0149550 | A1 * | 5/2016 | Zhu | H03G 5/165 381/103 |
| 2021/0193157 | A1 | 6/2021 | Craven et al. | |

FOREIGN PATENT DOCUMENTS

| | | | |
|---|---|---|---|
| EP | 2605549 | A1 | 6/2013 |
| WO | 2014108677 | A1 | 7/2014 |

OTHER PUBLICATIONS

Combined Search and Examination Report under Sections 17 and 18(3), UKIPO, Application No. GB2213858.0, dated Mar. 20, 2023.

* cited by examiner

*Primary Examiner* — Xu Mei
(74) *Attorney, Agent, or Firm* — Jackson Walker L.L.P

(57) ABSTRACT

An apparatus, comprising: an audio input for receiving an input audio signal; an tuning input for receiving a tuning signal; a filter chain comprising a plurality of filters for filtering the audio signal to produce a filtered input audio signal, the filter chain comprising: a first filter module operating at a first sampling rate; and a second filter module operating at a second sampling rate greater than the first sampling rate, wherein a phase response of the first filter module is dependent on the tuning input and wherein a magnitude response of the first filter module is substantially independent of the tuning input.

25 Claims, 6 Drawing Sheets

FILTERS AND FILTER CHAINS

The present disclosure claims priority to U.S. Provisional Patent Application Ser. No. 63/252,291, filed Oct. 5, 2021, which is incorporated by reference herein in its entirety.

TECHNICAL FIELD

The present disclosure relates to adaptable filters and filter chains for filtering audio signals.

BACKGROUND

Signal processing of audio signals to be output via a transducer, such as a loudspeaker, often comprise filter chains. Such filter chains often comprise a minimum phase filter or a linear phase filter. Minimum phase filters offer low latency but tend to suffer from high post-ringing. Linear phase filters offer low post-ringing but tend to suffer from high latency in addition to significant pre-ringing. The effects of pre-ringing, post-ringing, and high latency have all been found to be unpleasing to the human ear. Thus, the characteristics of minimum phase and linear phase filters each have both advantages and drawbacks.

SUMMARY

According to a first aspect of the disclosure, there is provided an apparatus, comprising: an audio input for receiving an input audio signal; an tuning input for receiving a tuning signal; a filter chain comprising a plurality of filters for filtering the audio signal to produce a filtered input audio signal, the filter chain comprising: a first filter module operating at a first sampling rate; and a second filter module operating at a second sampling rate greater than the first sampling rate, wherein a phase response of the first filter module is dependent on the tuning input and wherein a magnitude response of the first filter module is substantially independent of the tuning input.

The first sampling rate may be a base rate of the filter chain.

The first filter module may be configured to: change a level of pre-ringing and/or a level of post-ringing of the filter chain in dependence on the tuning signal.

In response to a change in the tuning signal, the first filter module may be configured to transition between having a linear phase response and having a minimum phase response.

In response to an increase in the tuning signal, the first filter module may be configured to: increase the level of pre-ringing in the filtered input signal due to the filter chain; and decrease the level of post-ringing in the filtered input signal due to the filter chain increases.

The second filter module may comprise a decimation filter. The first filter module may be provided after the second filter module in the filter chain and configured to output the filtered audio signal.

The second filter module may comprise an interpolation filter. The first filter module may be provided before the second filter module in the filter chain and configured to receive the input audio signal.

The first filter module comprises: a plurality of first filters for generating respective first filtered signals, the plurality of filter filters each having a different phase response; a multiplexer configured to switch between respective first filtered signals for output based on the tuning signal.

The first filter module may comprise: a pre filter for generating a pre-filtered signal. The plurality of first filters may be configured to generate the respective first filtered signals based on the pre-filtered signal. The pre-filter may comprise a minimum phase filter or a linear phase filter.

The plurality of first filters may each comprise an all-pass filter having a different phase response.

During switching between respective first filtered signals the multiplexer may be configured to output a weighted combination of two or more of the respective first filtered signals.

The multiplexer may be configured to switch between respective first filtered signals for output during a zero-crossing point of the input signal or during a period in which the input signal is below a signal threshold.

The period during which the multiplexer is configured to switch between respective first filtered signals may be chosen to psychoacoustically mask the switching.

The first filter module may comprise: a first filter for generating a first filtered signal; a second filter for filtering the first filtered signal to generate a second filtered signal, wherein a response of the second filter is dependent on the tuning signal.

The second filter may be an all-pass filter. The second filter may be adjustable between minimum phase and linear phase based on the tuning signal.

An impulse peak in a response of the second filter may be substantially independent of the tuning signal. Pre-ringing and post-ringing of the second filter may vary in dependence on the tuning signal.

Delay, pre-ringing and post-ringing of the second filter may vary in dependence on the tuning signal.

The first filter may be a minimum phase filter.

The first filter may be of the same order as the second filter, for example second order.

The apparatus may further comprise a tuning module configured to adapt the first filter module.

The tuning module may be configured to adapt the first filter module by adapting the tuning signal.

The tuning module may be configured to adapt the first filter module based on a characteristic of an audio system comprising the apparatus.

The characteristic of the audio system may comprise one of: a type of audio output device comprised in the audio system; and a type of amplifier comprised in the audio system.

According to a first aspect of the disclosure, there is provided an integrated circuit comprising the apparatus described above.

The tuning input may be coupled to a plurality of pins of the integrated circuit.

According to another aspect of the disclosure, there is provided an audio playback device comprising the apparatus or the integrated circuit described above. The audio playback device may comprise a high fidelity (Hi-Fi) stereo system.

According to a another aspect of the disclosure, there is provided a digital to analog converter (DAC) system comprising the apparatus or integrated circuit described above.

According to a another aspect of the disclosure, there is provided an audio playback device, comprising: an audio input for receiving an input audio signal from an audio source; an tuning input for receiving a tuning signal configurable by a user of the audio playback device; an audio output for delivering a filtered audio signal to an audio output device; a filter chain comprising a plurality of filters for filtering the input audio signal to produce the filtered audio signal, the filter chain comprising: a first filter module operating at a first sampling rate; and a second filter module operating at a second sampling rate greater than the first sampling rate, wherein a phase response of the first filter module is dependent on the tuning input and wherein a magnitude response of the first filter module is substantially independent of the tuning input.

The audio playback device may comprise a high fidelity (Hi-Fi) stereo system.

According to another aspect of the disclosure, there is provided an audio filter system comprising an oversampled filter chain, the filter chain comprising a plurality of audio filters, wherein a filter module of the filter chain running at the lowest sample rate of the chain is arranged to receive a tuning factor ALPHA to adjust the phase response of the filter module such that the pre-ringing and/or post-ringing of the overall filter chain is varied.

The filter module of the filter chain may run at the base rate of the filter chain, e.g. Fs of the filter chain.

In one example, the filter chain comprises a decimation filter chain, wherein the filter module is provided as the last filter of the decimation filter chain. In an alternate example, the filter chain comprises an interpolation filter chain, wherein the filter module is provided as the first filter of the interpolation filter chain.

In one example, there is provided a filter module comprising: a first filter to receive an input signal and provide a first filtered signal, and a second filter to receive the first filtered signal and provide a second filtered signal as an output signal, where the first and second filters present a combined filter response for the filter module, the second filter arranged to receive a tuning factor ALPHA to dynamically adjust a level of pre-ringing of the filter module, while maintaining a magnitude response of the filter module.

In one example, there is provided a filter module comprising: a first filter to receive an input signal and provide a first filtered signal, a plurality of second filters to receive the first filtered signal and provide a plurality of second filtered signals, the plurality of second filters having different phase responses, and a multiplexer to receive the plurality of second filtered signals and provide an output signal selected from the plurality of second filtered signals, where the first filter and the selected second filter present a combined filter response for the filter module, wherein the multiplexer is arranged to receive a tuning factor ALPHA to select one of the plurality of second filtered signals to be output.

In one example, there is provided a filter module comprising: z plurality of first filters to receive an input signal and provide a plurality of first filtered signals, the plurality of first filters having different phase responses, and a multiplexer to receive the plurality of first filtered signals and provide an output signal selected from the plurality of first filtered signals, wherein the multiplexer is arranged to receive a tuning factor ALPHA to select one of the plurality of first filtered signals to be output.

It will be understood that the filter module may be used to dynamically adjust the level of pre-/post-ringing of an entire filter chain comprising the module. Preferably, the second filter is an all-pass filter. Preferably, the second filter is selected to be of the same filter order as the first filter. Preferably, the second filter is configured such ALPHA can be adjusted from a minimum value where the effect of the second filter on the first filtered signal is minimised, and as ALPHA is increased the pre-ringing effect on the first filtered signal is reduced and the post-ringing effect is increased.

In example, the first filter is a minimum phase filter, preferably an IIR filter. In an alternate embodiment, the first filter is a linear phase filter, preferably an FIR filter.

In one example, the tuning factor ALPHA or the level of adjustment of the second filter is selected based on the use case of an audio system comprising the filter system, for example the audio output mode selected, e.g. speakers vs. headphones.

In an additional or alternative example, the tuning factor ALPHA or the level of adjustment of the second filter is selected based on the characteristics of an audio system comprising the filter system, e.g. programmed at initial setup of a device, e.g. mobile phone vs hi-fi audio amplifier.

In an additional or alternative example, the tuning factor ALPHA or the level of adjustment of the second filter is selected based on one or more audio parameters extracted from an audio track to be played through the filter module, including but not limited to: crest factor; peak amplitude; spectral tilt; and/or average power.

In an additional or alternative example, the tuning factor ALPHA or the level of adjustment of the second filter is selected based on metadata encoded in an audio track to be played through the filter module.

There is further provided an integrated circuit comprising the above filter system or filter module.

There is further provided an audio system comprising: an input to receive an audio signal, an audio filter system as described above to filter the audio signal, and an output to provide the filtered audio signal for output by an audio transducer. The audio system may comprise an integrated audio transducer to output the filtered audio signal, e.g. a loudspeaker.

Additionally or alternatively, the audio system may be coupled with an audio accessory comprising an audio transducer to output the filtered audio signal, e.g. headphones or earbuds, a wearable audio device. The audio accessory may be coupled with the audio system via a wired or wireless connection.

The audio system may comprise a personal audio device, e.g. a personal phone, tablet computer, laptop, personal music player.

The audio system may comprise an interface to allow a user to dynamically adjust the tuning factor ALPHA of the filter module. Additionally or alternatively, the audio system may comprise a memory storage to store different audio profile, the audio profiles defining different configurations of the filter module, e.g. comprising different values of alpha, wherein a user can select between different audio profiles to be used for the audio system.

The audio system may comprise a display to present a graphical user interface to a user, to allow the user to adjust the tuning factor ALPHA of the filter module.

In a further example, the above-described filter module is implemented using a machine learning module trained using the filter response.

There is further provided a filter method comprising the steps of: providing an audio filter chain comprising a filter module having an adjustable phase response; receiving an audio signal to be filtered at the filter module; receiving a tuning factor ALPHA; and adjusting the phase response of the filter module based on ALPHA, to vary the pre-ringing and/or post-ringing of the overall filter chain.

There is further provided a filter method comprising the steps of: receiving an audio signal to be filtered; performing a first filter operation of the audio signal to generate a first filtered signal; and performing a second filter operation on the first filtered signal to generate an output signal, wherein the second filter operation is dynamically adjustable to vary the level of pre-ringing in the output signal.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to devices, systems and filter chains incorporating filters. Such filters may be used to filter an input signal to provide an output signal for output to an audio output device, such as a transducer. In some embodiments, an audio filter system receives an audio input signal to be filtered which is then sent to an audio transducer, such as a loudspeaker, for playback. Such filter systems may be provided as part of an electronic device. Examples of such electronic devices include but are not limited to portable audio electronic devices, such as portable phones, tablets, laptop computers, personal media players; audio playback equipment such as Hi-Fi amplifiers, DACs, etc. As illustrated below, the various filter arrangements described below may be provided as part of a host device having an integrated audio transducer, for example a portable device with an integrated loudspeaker. Additionally or alternatively, various filter arrangements described herein may be coupled with an audio playback accessory such as headphones, earbuds, separate speaker units, and the like. Such coupling may be wired or wireless.

Figure 1:
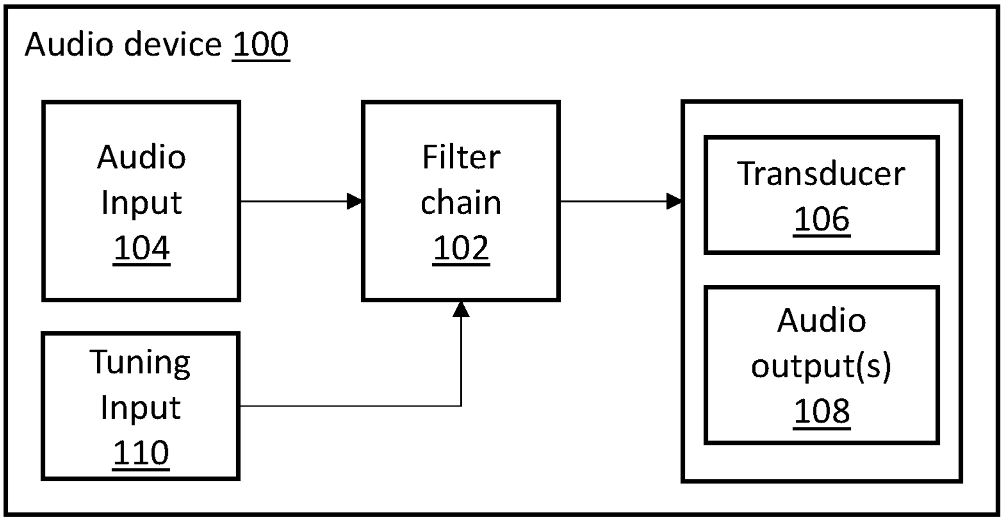
FIG. 1 is a schematic diagram of an audio device according to embodiments of the present disclosure.

FIG. 1 is a schematic diagram of an audio playback device 100 incorporating an adaptive filter chain 102 according to embodiments of the present disclosure. The device 100 comprises an audio input 104 and the adaptive filter chain 102. The device 100 may also comprise a transducer 106 integrated into the device 100 and/or one or more audio outputs 108.

It will be understood that other components not illustrated in FIG. 1 may be provided as part of the signal chain, for example before the audio input 104, between the audio input 104 and the filter chain 102 and/or between the filter chain 102 and the one or more outputs 108, and/or after the audio outputs 108. Such other components may comprise one or more of amplifiers, buffers, signal processors, analog-to-digital converters (ADCs), digital-to-analog converters (DACs), etc. Various example signal chains will be described below.

The audio input 102 may be configured to receive an audio input signal. The audio input signal may be generated by a transducer (e.g., a microphone (not shown)) or may be generated from playback media, such as a media file stored in memory, or media received from a separate audio device, such as a compact disc (CD) player, a vinyl record player, a tape cassette player or the like.

The transducer 102 may be integrated into the audio device 102. For example, where the audio device is a portable device such as a smartphone or smart speaker, the transducer may be integrated therein. Additionally or alternatively, the one or more audio outputs 108 may be provided to output a filtered audio signal to one or more external audio playback devices, such as external separate speakers or the like. The one or more audio outputs 108 may be wired and/or wireless.

In addition to the audio input 104, the audio device 100 may comprise a tuning input 110 which may be provided to the filter chain 102. The tuning input 110 for receiving a tuning signal and providing the tuning signal to the filter chain 102. The tuning input may comprise an interface (not shown) to enable a user to adjust the tuning signal provided to the filter chain 102. For example, the interface may comprise an analog or digital adjustment knob located on the audio device 100 or a digital interface, such as a touch-screen.

The filter chain 102 may be implemented on an integrated circuit which may also comprise one or more of the audio input 104, the tuning input 110 and/or the audio output(s) 108.

The filter chain 102 is configured to adaptively filter the input audio signal based on the tuning signal received from the tuning input 110.

It will be appreciated that conventional audio filters tend to be implemented as either a minimum phase filter or a linear phase filter. Each type of filter has advantages and disadvantages.

Figure 2:
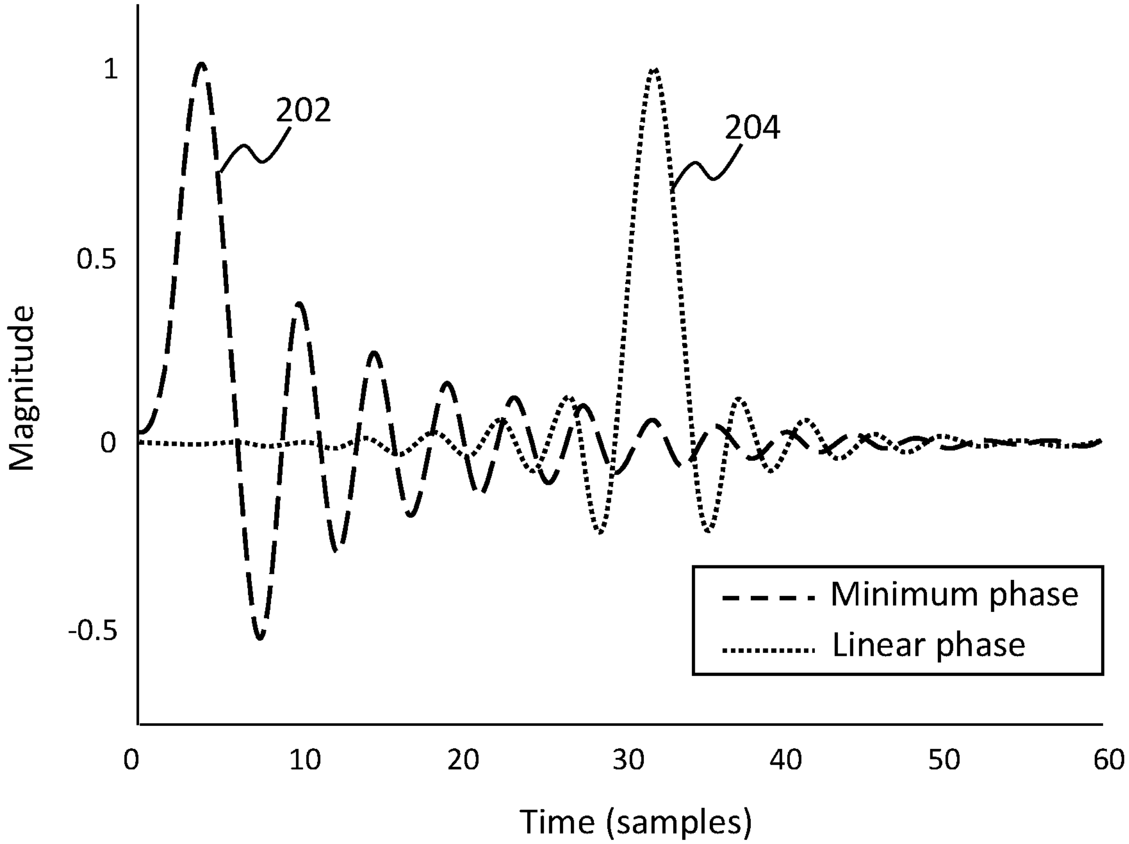
FIG. 2 is a graph showing impulse responses of a minimum phase filter and a linear phase filter.

FIG. 2 is a graph showing the impulse response of a traditional minimum phase filter 202 and a traditional linear phase filter 204. It can be seen that the latency of the minimum phase filter 202 is much lower than the linear phase filter 204, as evidenced by comparing respective impulse peaks at 5 samples and around 32 samples, respectively. There is also little or no pre-ringing in the impulse response of the minimum phase filter 202, partly due to its low latency. In contrast, the impulse response of the linear phase filter 204 exhibits a reasonable degree pre-ringing before its peak. Finally, both the minimum phase filter 202 and the linear phase filter 204 exhibit post-ringing. However, the post-ringing in the impulse response of the minimum phase filter 202 is of substantially greater magnitude than that of the linear phase filter 204.

Thus minimum phase filters and linear phase filters have different effects on audio signals, such effects being audibly perceptible to humans. For example, pre-ringing rarely occurs in nature, since such a phenomena corresponds to hearing the effect of a sound source before the originating sound. Thus, there is evidence to suggest that minimum phase filters provide a listener with a more natural sound than that of linear phase filters. However, since minimum phase filters exhibit greater post-ringing, it has been suggested that a subjectively optimum listening experience is achieved when an audio signal is filtered by a filter somewhere in between fully minimum phase and fully linear phase.

Embodiments of the present disclosure aim to address or at least ameliorate one or more of the short falls of minimum phase filters and linear phase filters by implementing a filter which fuses the beneficial features of both filters. It is proposed to control the amount of pre-ringing and post-ringing whilst achieving an acceptably low latency.

Figure 3:
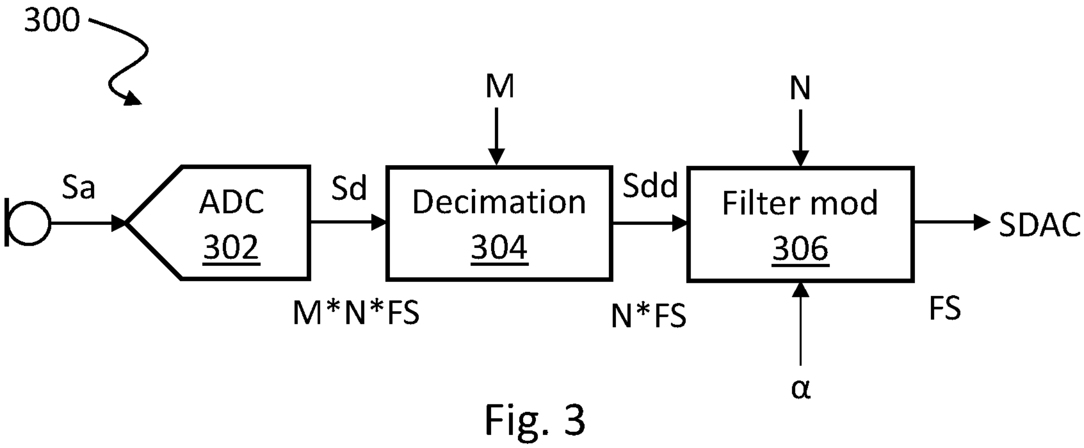
FIG. 3 is a block diagram of a decimation filter chain incorporating a filter module according to embodiments of the present disclosure.
Figure 4:
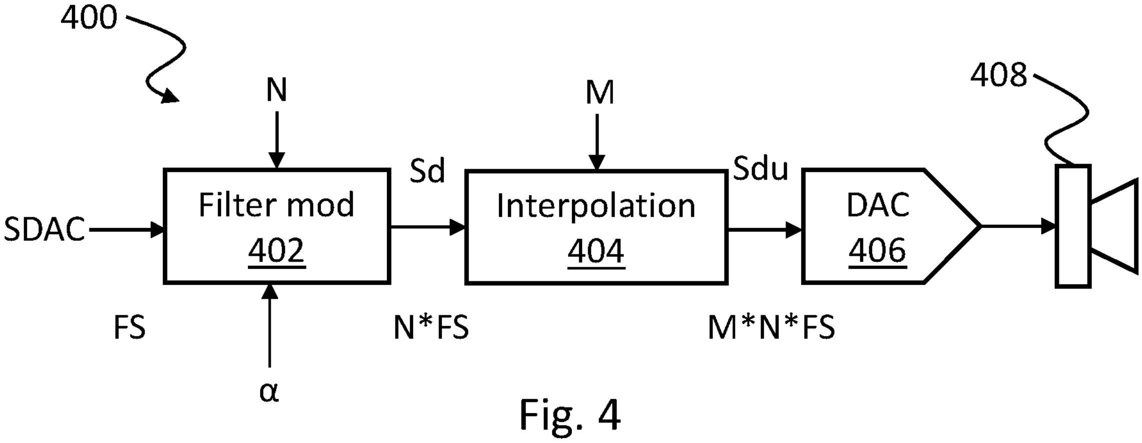
FIG. 4 is a block diagram of an interpolation filter chain incorporating a filter a filter module according to embodiments of the present disclosure.

The filter chain 102 may be implemented as a decimation (downsampling) filter chain and/or an interpolation (upsampling) filter chain, depending on the required application. For example, a decimation filter chain may be implemented when a signal is being converted from the analog domain. For example, an interpolation filter chain may be implemented when a signal is being converted to the analog domain. FIGS. 3 and 4 provide two examples of such implementations.

FIG. 3 is a schematic diagram of an exemplary implementation of a decimation filter chain 300 comprising a microphone 302, an ADC 304, a decimation filter 306, and an adaptive filter module 308. An analog input signal Sa is generated at the microphone 302 and provided to the ADC 304. The ADC 304 is configured to convert the analog input signal Sa to a digital representation Sd. The ADC 304 is preferably configured to oversample the analog input signal Sa at a frequency substantially greater than the base sampling frequency Fs of the filter chain 300. In the example shown, the ADC 304 is configured to sample the analog input signal Sa at a frequency of M×N×Fs (or MN times the sampling frequency Fs).

The oversampled digital representation Sd is then provided to the decimation filter 306 which decimates the digital representation Sd to a sampling frequency lower than that of the digital representation Sd. In the example shown, the decimation filter 306 decimates the digital representation Sd by a factor M to a sampling frequency of approximately N×Fs. As is known in the art, by downsampling, the decimation filter 306 may reduce variance associated with quantization noise associated with the ADC 304 whilst maintaining signal power, thus improving signal-to-noise ratio (SNR).

The decimated digital signal Sdd is then provided to the adaptive filter module 308 which filters the signal Sdd in dependence on a tuning signal (or factor) alpha a. The adaptive filter module 308 filters the signal Sdd at the base sampling rate Fs thus generating a filtered output signal SDAC at the base sampling rate Fs. The filtered output signal SDAC may then be processed as appropriate using, for example a CODEC or an applications processor.

FIG. 4 is a schematic diagram of an exemplary implementation of a decimation filter chain 300 comprising an adaptive filter module 402, an interpolation filter 404 and a DAC 406. A digital input signal SDAC is received having a sampling rate of the base rate Fs of the filter chain 300. The digital input signal SDAC is filtered by the adaptive filter module 402 in dependence on a tuning signal (or factor) alpha a. The filtered digital signal Sd is thus provided to the interpolation filter 404 at a sampling frequency greater than the base rate Fs, in this case N times the base rate Fs (i.e. N×Fs). The interpolation filter 404 upsamples the filtered digital input signal Sd by a factor M to frequency of M×N×Fs. The upsampled filtered signal Sdu is then provided to the DAC 406 which converts the signal into the analog domain to generate an analog audio signal Sa. The analog audio signal Sa may then be provided to a transducer 408, such as a loudspeaker.

It will be appreciated that pre-ringing and post-ringing effects associated with various minimum and linear phase filters tend to dominate signals output from signal chains into which they are incorporated. Accordingly, it is preferable to implement the filter module 308 at the lowest sample rate possible. For example, it is preferable to provide the filter module 308 at the end of the decimation filter chain 300. In contrast, for example, it is preferable to provide the filter module 402 at the beginning of the interpolation filter chain 400.

Various implementations of the adaptive filter modules 306, 402 will now be described with reference to FIGS. 5 to 7.

Figure 5:
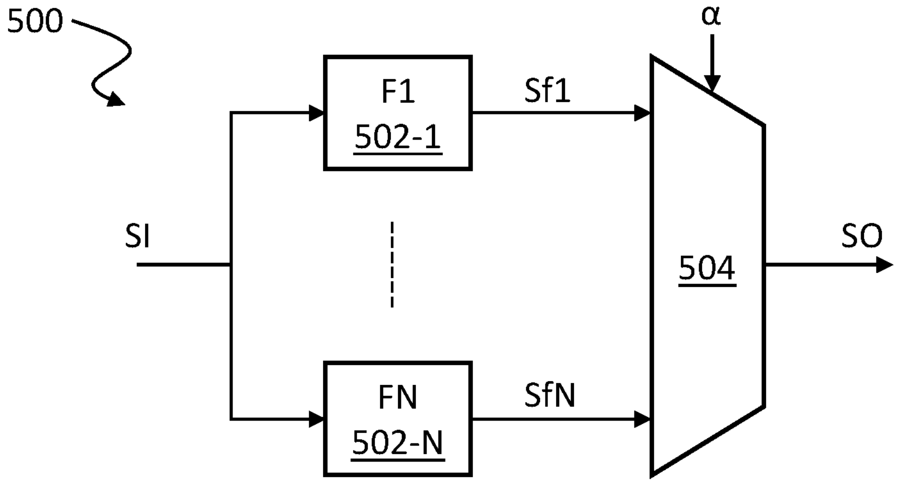
FIG. 5 is a block diagram of an example filter module according to embodiments of the present disclosure.

FIG. 5 is a schematic diagram of an exemplary adaptive filter module 500.

The filter module 500 comprises a plurality of N first filters 502-1:502-N and a multiplexer 504. An input signal SI is provided to each of the filters 502-1:502-N, which are each designed to have a different phase response. For example, each of the filters 502-1:502-N may be designed with different amounts of pre- and/or -post-ringing attributes. The plurality of filters 502-1:502-N generate a plurality of filtered audio signals Sf1:SfN which are provided to the multiplexer 504.

The multiplexer 504 may be configured to select between one of the filtered audio signals Sf1:SfN for output as an output signal SO. Additionally, or alternatively, the multiplexer 504 may be configured to combine (e.g. blend) two or more of the filtered audio signals Sf1:SfN to be output as the output signal SO. For example, the multiplexer 504 may comprise one or more mixers (not shown) configured to output a weighted combination of two or more of the filtered audio signals Sf1:SfN. Weights applied to each of the two or more filtered audio signals Sf1:SfN may be controlled so as to smoothly transition from one filter to another.

The selection or combining is performed in dependent on a tuning signal (or tuning factor) alpha provided to the multiplexer 504. As such, the tuning signal alpha can be used to control the pre- and/or post-ringing effect of the filter module 500.

Figure 6:
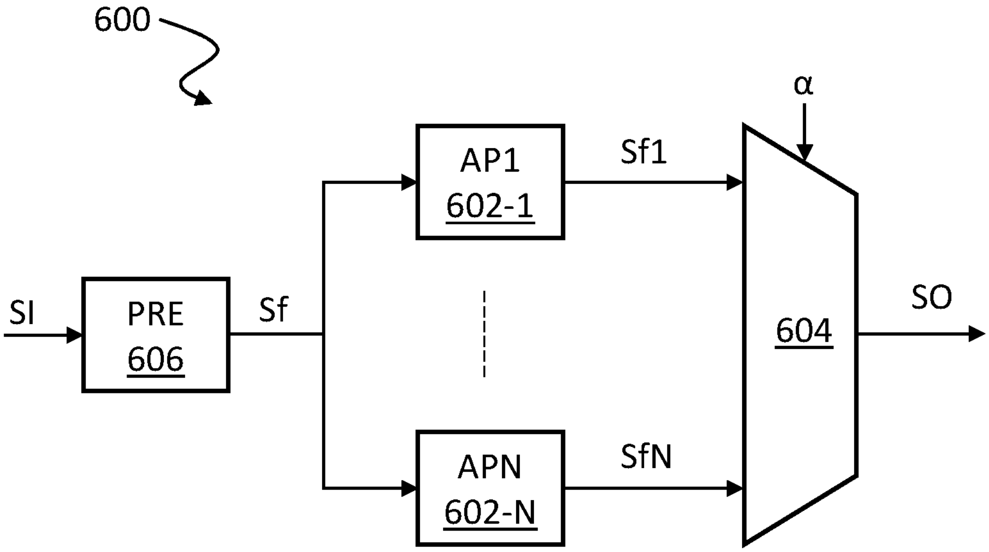
FIG. 6 is a block diagram of an example filter module according to embodiments of the present disclosure.

FIG. 6 is a schematic diagram of another exemplary adaptive filter module 600.

Like the filter module 500, the filter module 600 comprises a plurality of N first filters 602-1:602-N and a multiplexer 604. In addition, the filter module 600 comprises a pre-filter 606. An input signal SI is provided to the pre-filter 606 which outputs a pre-filtered signal Sf, which is provided to each of the plurality of N first filters 602-1:602-N. Respective filtered audio signals Sf1:SfN are provided to the multiplexer 604 which operates in a similar manner to the multiplexer 504 to output one of the filtered audio signals Sf1:SfN or a weighted combination of two or more of the filtered audio signals Sf1:SfN as the output signal SO. Such selecting and/or combining is performed in dependence on the tuning signal alpha provided to the multiplexer 604.

Thus, by adjusting the tuning signal alpha, pre- and post-ringing effects of the filter module 600 can be varied to vary the output signal SO.

The pre-filter 606 preferably comprises a minimum phase filter. The plurality of N first filters 602-1:602-N each comprise an all-pass filter having a different phase response to the remainder of the plurality of first filters 602-1:602-N.

By providing two separate filtering steps using the pre-filter 606 (e.g., a minimum phase filter) and separate all-pass filters (the plurality of N first filters 602-1:602-N), the overall complexity of the filter module 600 is reduced when compared to the filter module 500 described above with reference to FIG. 5.

With both of the filter modules 500, 600 described above, to minimize any audible artefacts associated with the switching and/or combining performed at the multiplexers 504, 604, transitions between the various filtered audio signals Sf1:SfN may be performed at certain points in the input signal SI. For example, transitions may be performed during zero-crossing points in the input signal SI or one or more of the filtered audio signals Sf1:SfN. For example, transitions may be performed during periods in which the input signal SI is below a threshold magnitude. For example, transitions may be performed at points at which any audible artifact would be psychoacoustically masked in the output signal SO, so as to be substantially inaudible to human hearing.

Figure 7:
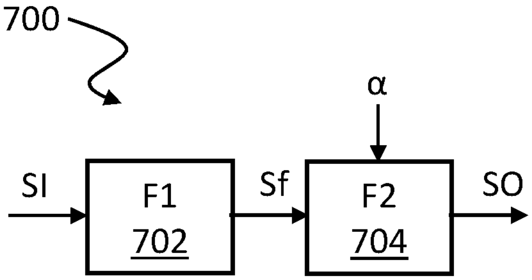
FIG. 7 is a block diagram of an example filter module according to embodiments of the present disclosure.

FIG. 7 is a schematic diagram of another exemplary adaptive filter module 700.

The filter module 700 comprises a first filter 702 (or pre-filter) and a second filter 704. An output of the first filter 702 is provided to the second filter 704. The second filter 704 also received a tuning signal alpha a. The first filter 702 is preferably a substantially fixed (non-variable) filter. The second filter 704 is preferably implemented as a variable all-pass filter.

When an input signal SI is provided to the first filter 702, the first filter 702 implements an initial filtering of the input signal SI to generate a filtered signal Sf. The filtered signal Sf is then provided to the second filter 704 which performs additional filtering based on the tuning signal alpha and outputs the additionally filtered signal as an output signal SO.

As noted above, the response of the second filter 704 is controlled by varying the tuning signal alpha. Thus, the tuning signal can be adjusted to vary the overall response of the filter module 702 between minimum phase and linear phase. By combining the use of a fixed first filter 702 and a variable all-pass second filter 704, the shape of the response of the filter module 700 can be adjusted, and thus the pre- and post-ringing effects of the filter module 700.

Preferably the first filter 702 is a minimum phase filter. It has been found that the combination of a minimum phase filter and an all-pass filter can be tuned to affect any non-minimum phase filter. For example, a non-minimum filter T(z) with a single zero, a, outside the unit circle may be defined as:

$$T(z)=H(z)(1-az^{-1})$$

Hence:

$$T(z)=H(z)\left(1-\frac{z^{-1}}{a}\right)\left(\frac{1-az^{-1}}{1-\frac{z^{-1}}{a}}\right)$$

-continued $$H_{MINIMUM-PHASE}=H(z)\left(1-\frac{z^{-1}}{a}\right)$$

$$H_{ALL-PASS}(z)=\left(\frac{1-az^{-1}}{1-\frac{z^{-1}}{a}}\right)$$

Thus, by implementing the first filter 902 as a minimum phase filter in combination with the variable all-pass second filter 704, the first filter module 700 may be configured to implement any non-minimum phase filter characteristic.

The first filter module 700 may be implemented either with a constant delay or a variable delay.

A constant delay implementation may ensure that, as the tuning signal alpha is varied, the peak of the impulse response is substantially constant with respect to time, whilst the pre- and post-ringing present in the impulse response varies. Such an implementation may be desirable in situations where time alignment is preferable. For example, such implementations may be preferably where the output signal SO output from the filter module 700 is being mixed with other signals and/or where the stereo image of any such mixing is important.

To achieve constant delay, the first filter 702 may be implemented as a minimum phase filter. However, instead of exploiting the minimum phase filter to achieve low latency, the delay between the first and second filter 702, 704 is preferably substantially the same and independent of the tuning signal alpha.

Preferably, the first, minimum phase filter 702 and the second, all-pass filter 704 are of the same order. However, in some embodiments, it may be beneficial to implement the second filter as an approximation of an all-pass filter. In which case, a second order all-pass filter of the following form may be used:

$$H(z)=\frac{k+\frac{z^{-1}}{2^{ALPHA}}+z^{-2}}{1+\frac{z^{-1}}{2^{ALPHA}}+k\cdot z^{-2}}$$

The term ALPHA is the tuning signal or tuning factor—a parameter used to control the degree of pre-ringing. The constant k is filter-dependent and may be determined by numerical optimisation.

Figure 8:
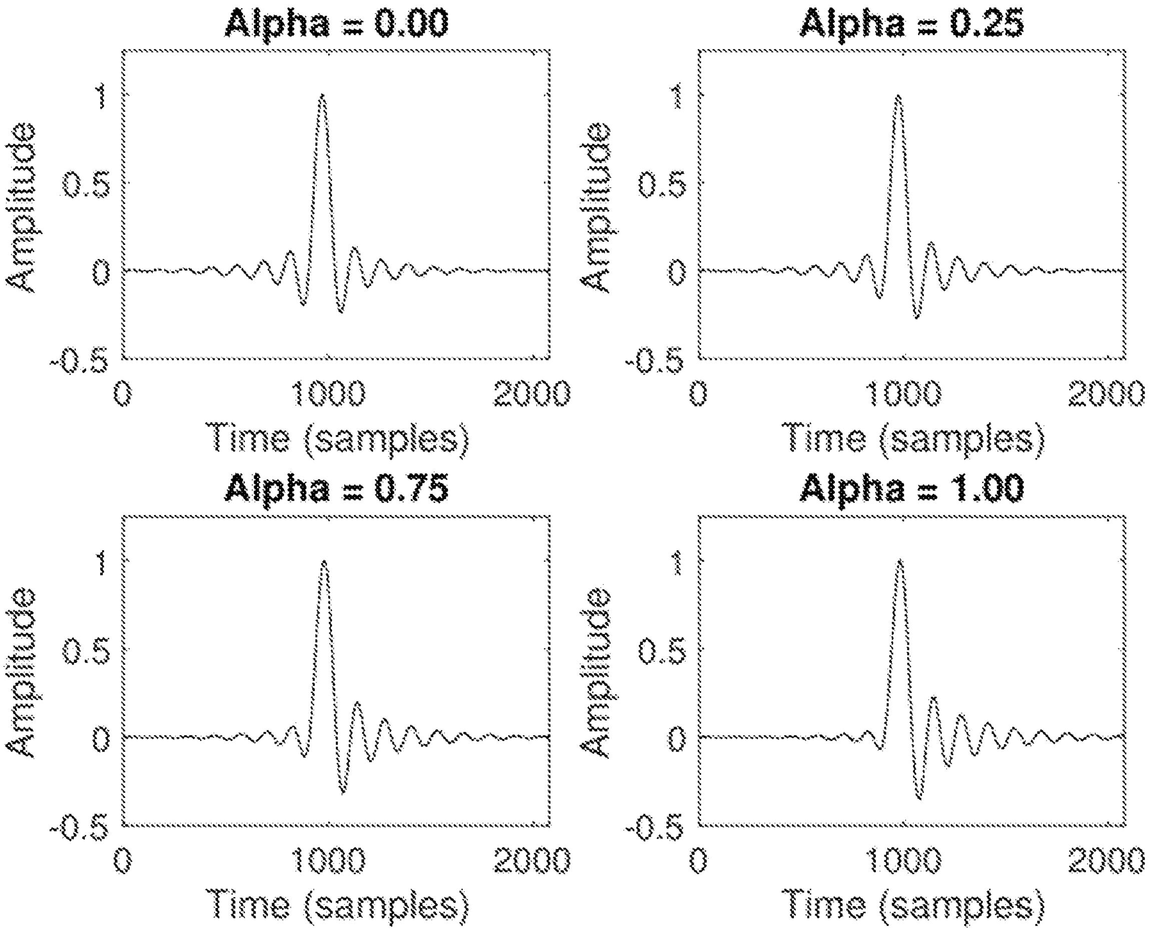
FIG. 8 graphically illustrates impulse responses for a constant delay implementations of the filter module shown in FIG. 7 for various values of a tuning factor.

FIG. 8 shows the impulse response for the filter module 700 implementing the above all-pass filter as the second filter 704 for various values of alpha between 0 and 1. For alpha=0, the phase distorting effect of the all-pass filter 704 is minimized. As alpha increase, the pre-ringing effect of the filter 704 is reduced and the post-ringing effect is increased.

Referring again to FIG. 7 and as mentioned above, the first filter module 700 may be implemented with a variable delay. In a variable delay implementation, variation of the tuning signal alpha leads to a variation in the delay or latency of the impulse response as well variation of pre- and post-ringing. In other words, the peak of the impulse response varies with variation of the tuning signal alpha.

Figure 9:
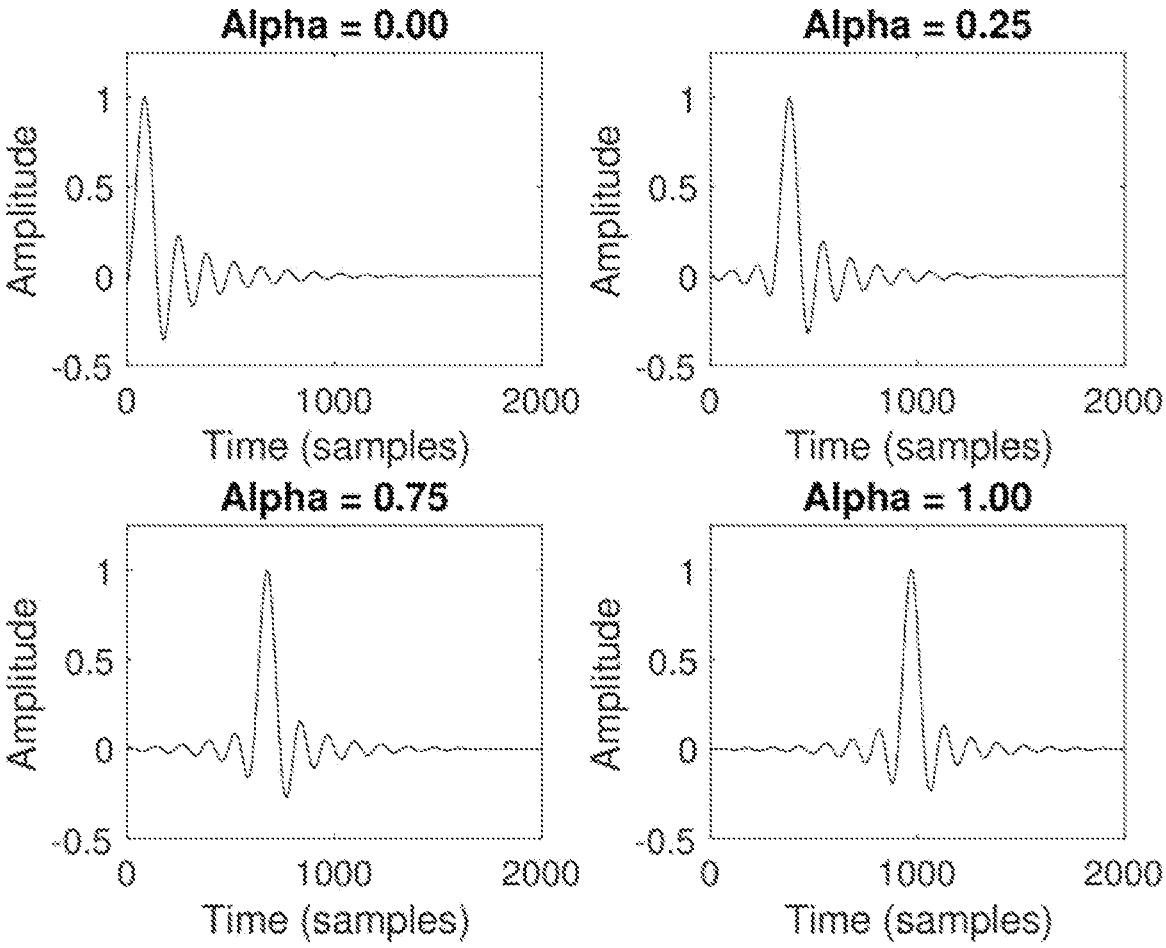
FIG. 9 graphically illustrates impulse responses for a variable delay implementations of the filter module shown in FIG. 7 for various values of a tuning factor.

FIG. 9 shows the impulse response for the filter module 700 implementing the above all-pass filter as the second filter 704 for various values of alpha between 0 and 1. For alpha=0, the delay of the filter 700 is minimized and post-ringing is pronounced. As alpha increase, the delay and pre-ringing effect of the filter 704 is increased, whilst the post-ringing effect of the filter 704 is reduced.

As has been explained in detail above, pre- and post-ringing and delay implemented by the filter chain 102 and/or the filter modules 500, 600, 700 may be adjusted by varying a tuning signal or tuning factor. It will be appreciated that specific filter characteristics, as adjusted by the tuning signal, may be application specific. Embodiments of the present disclosure may provide various control mechanisms for determining the tuning signal which may be based on, for example, a type of output device to which a filtered signal is to be output, one or more characteristics of the input audio, one or more preferences of a user, such as a listener of the audio being output.

Figure 10:
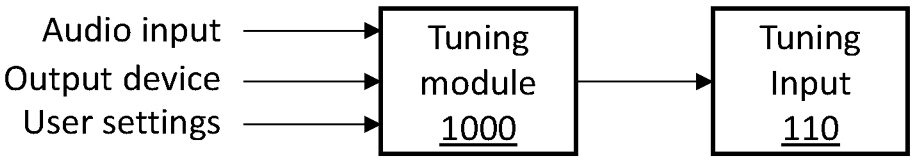
FIG. 10 is a block diagram of a tuning module according to embodiments of the present disclosure.

FIG. 10 is a schematic diagram of an example tuning module 1000 configured to generate a tuning signal to be provided to the tuning input 110 of the device 100 shown in FIG. 1. The tuning module 1000 may be implemented as part of the audio device 100 or as a separate module. The tuning module 1000 may receive one or more inputs pertaining to various characteristics. In the example shown, the tuning module 1000 may receive data pertaining to the audio input signal, the audio output device or devices, and/or any user settings. Embodiments are not, however, limited to the tuning module 1000 receiving these inputs.

Through testing, it has been found that linear phase filters tend to provide more pleasing sounds to users listening through headphones when compared to minimum phase filters. In contrast, it has been found that minimum phase filters tend to provide more pleasing sounds to users listening through loudspeakers when compared to linear phase filters. As such, the tuning module 1000 may receive data relating to the audio device to which any filtered signal is output, such as the transducer 106 and/or any device connected via the audio output(s) 108 of the device 100. The tuning module 1000 may then adjust the tuning signal depending on the output device (or playback device). Additionally or alternatively, the tuning module 1000 may be configured to adjust the tuning signal based on a type of amplifier used to amplify the input audio signal.

Testing has also shown that input audio with a low crest factor tend to sound between when filtered with linear phase filters when compared to minimum phase filters. It has also been found that other characteristics of an input audio signal cause differing output signal characteristics when filtered by linear phase filters vs minimum phase filters. Such characteristics include but are not limited to peak amplitude, spectral tilt and average power. In some embodiments, the tuning module 1000 may be configured to extract one or more parameters from the received input audio (or representative audio file). In some embodiments, such parameters may be extracted elsewhere and provided to the tuning module 1000. The one or more extracted parameters may then be used to dynamically vary the tuning signal provided by the tuning input 110.

It will be appreciated that different users may experience sound in different ways. As such, in addition to or instead of taking into account one or more of the input audio signal and the output device configuration, the tuning factor 1000 may receive one or more user settings or preferences. For example, the user may provide an input to the tuning module 1000 or other interface to adjust the amount of post- and/or pre-ringing and/or delay provided by the filter chain 102.

In some embodiments, the tuning module 1000 may be configured to look-ahead at the input signal being received. With advanced knowledge of the input signal to be filtered, the level of pre- and/or post-ringing may be adjusted in dependence on the input audio signal, for example in the manner discussed above.

It will be appreciated that dynamic adjustment of the tuning signal may impact the listening experience. This may be particularly applicable where the signal being filtered is part of a stereo pair. In some embodiments, the tuning signal may be fixed for a particular audio track (e.g. song) or portion of audio. For example, tuning signal information may be included in track metadata associated with an audio file to which the input audio pertains. In another example, one or more audio parameters of a playback file or track may be provided in metadata and the tuning module 1000 may use that metadata to set the tuning signal.

In some embodiments, the tuning module 1000 may set the tuning signal for the particular device which is processing the input audio signal, such as the audio device 100.

In any of the embodiments described herein, the filter response of the various filters, may be learnt using machine learning. For example, a trained neural network or machine learning module may be trained on data to replicate the operation of a desired filter module (which may be adjustable). A desired filter response may be provided to the machine learning module. The output of the filter may then be learned as a function of the tuning signal, alpha. In some embodiments, the output may be estimated using (optionally recurrent) neural network prediction. For example, a neural network may be trained with inputs relating to a set of impulse responses. The trained neural network may then be used to predict the filter response based on tuning signal. Implementations of neural networks are known in the art and so will not be described in detail here.

A method for interpolating between minimum and linear phase filters will now be described with reference to FIG. 11. Such a method may be implemented by the filter chain 102 of the device 100.

Figure 11:
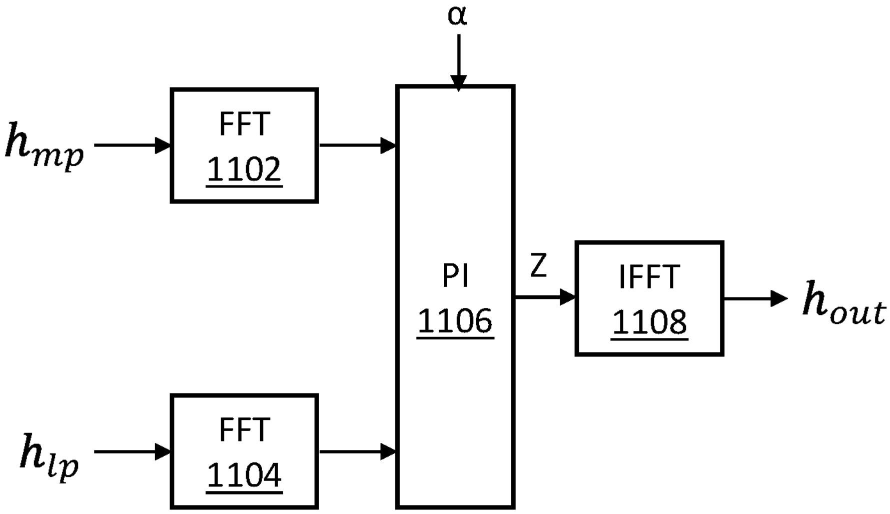
FIG. 11 is a block diagram of a process for interpolating a minimum phase filter and a linear phase filter.

FIG. 11 is a block diagram showing a process for generating a mixed impulse response $h_{out}$ anywhere in-between a minimum phase impulse response $h_{mp}$ and a linear phase impulse response $h_{lp}$.

The minimum phase impulse response $h_{mp}$ and the linear phase impulse response $h_{lp}$ are provided to respective FFT modules 1102, 1104 for conversion to the frequency domain. The frequency domain representations of the minimum phase and linear phase impulse responses $h_{mp}$, $h_{lp}$ are then provided to a phase interpolation (PI) module PI 1106. The PI module 1106 may be configured to interpolate between the two-phase responses based on a tuning factor or tuning signal $\alpha$. The PI module 1106 may be configured to perform the following operation in which the phase responses $\theta_{mp}$, $\theta_{lp}$ of the two filters $h_{mp}$, $h_{lp}$ are used to calculate a mixed/new phase response $\theta_{out}$:

$$\theta_{out}=\alpha*\theta_{mp}+(1-\alpha)*\theta_{lp}$$

The PI module may then determine a filter characteristic Z derived from the magnitude response of one of the input filters $h_{mp}$, $h_{lp}$ and the new phase response.

For example, where the magnitude response of the minimum phase input filter $h_{mp}$ is used, Z may be defined by the following equation:

$$Z=|Z|e^{i\theta_{out}}=|Z_{mp}|\cos\theta_{out}+i|Z_{mp}|\sin\theta_{out}$$

For example, where the magnitude response of the linear phase input filter $h_{lp}$ is used, Z may be defined by the following equation:

$$Z=|Z|e^{i\theta_{out}}=|Z_{lp}|\cos\theta_{out}+i|Z_{lp}|\sin\theta_{out}$$

The filter characteristic Z may then be provided to an inverse FFT module 1108 to be converted to the mixed/output filter response $h_{out}$.

Figure 12:
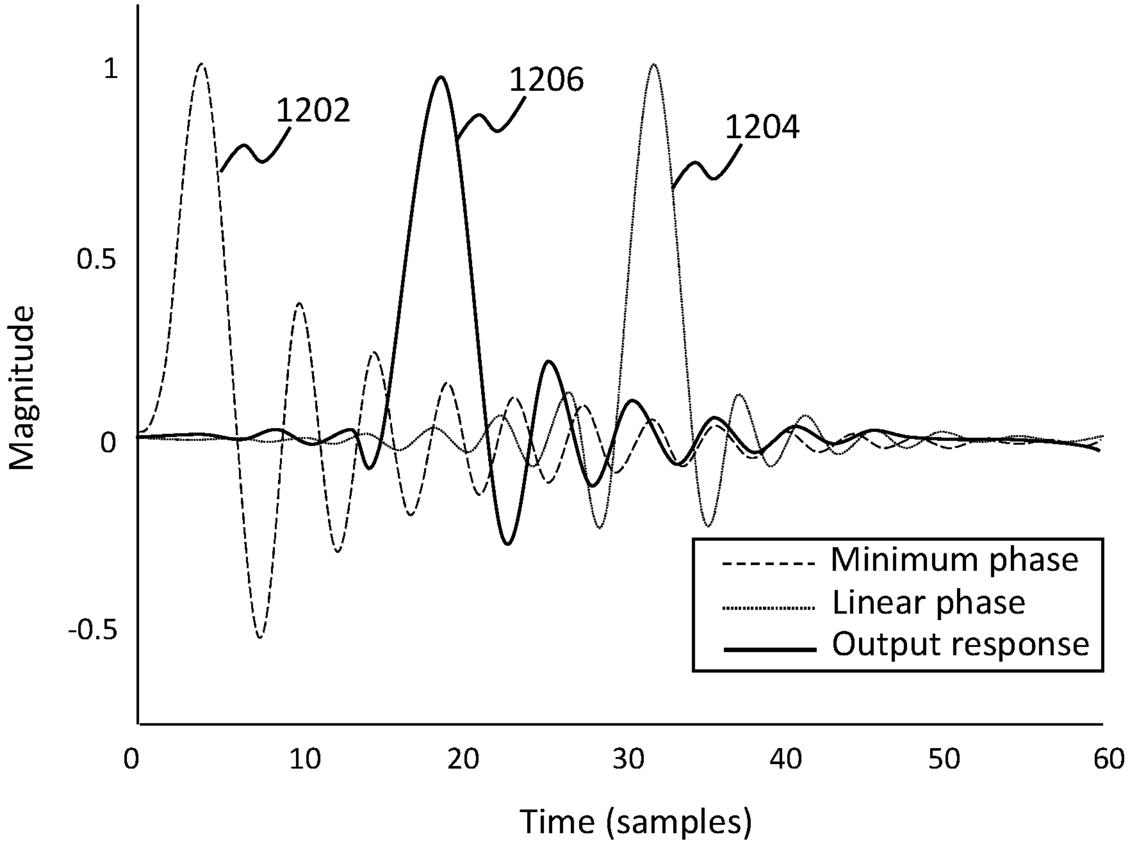
FIG. 12 is a graphical illustration of the result of the process shown in FIG. 11.

FIG. 12 graphically illustrates the minimum and linear phase impulse responses $h_{mp}$, $h_{lp}$ 1202, 1204 and the output impulse response $h_{out}$ 1206 using the magnitude response of the minimum phase input filter $h_{mp}$. It can be seen that the output impulse response consists of a blend of characteristics of each of the minimum and linear phase impulse responses $h_{mp}$, $h_{lp}$ 1202, 1204.

The above method described with reference to FIGS. 11 and 12 may be used both for constant delay and variable delay implementations.

In any of the embodiments described herein, the filter chains or filters may be implemented in hardware or in software. In some embodiments, the filter chains or filters may be implemented into one or more integrated circuits (ICs). Adaptation of filter characteristics, for example by adjustment of tuning signals or factors, may be implemented through adjustment of voltages at one or more pins of such ICs. When incorporated into an electronic device, such as the device 100, an analog or digital interface may be provided that the user can use to adjust one or more variables to their taste. Such an arrangement may be particularly applicable when the filter chains or filters described herein are incorporated into audio playback equipment, such as Hi-Fi amplifiers, DACs, or the like.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote-control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. An apparatus, comprising:
an audio input for receiving an input audio signal;
an tuning input for receiving a tuning signal;
a filter chain comprising a plurality of filters for filtering the audio signal to produce a filtered input audio signal, the filter chain comprising:
a first filter module operating at a first sampling rate; and
a second filter module operating at a second sampling rate greater than the first sampling rate,
wherein a phase response of the first filter module is dependent on the tuning input and wherein a magnitude response of the first filter module is substantially independent of the tuning input.

2. The apparatus of claim 1, wherein the first sampling rate is a base rate of the filter chain.

3. The apparatus of claim 1, wherein the first filter module is configured to:
change a level of pre-ringing and/or a level of post-ringing of the filter chain in dependence on the tuning signal.

4. The apparatus of claim 1, wherein, in response to a change in the tuning signal, the first filter module is configured to transition between having a linear phase response and having a minimum phase response.

5. The apparatus of claim 1, wherein the second filter module comprises a decimation filter, wherein the first filter module is provided after the second filter module in the filter chain and configured to output the filtered audio signal.

6. The apparatus of claim 1, wherein the second filter module comprises an interpolation filter, wherein the first filter module is provided before the second filter module in the filter chain and configured to receive the input audio signal.

7. The apparatus of claim 1, wherein the first filter module comprises:
a plurality of first filters for generating respective first filtered signals, the plurality of filter filters each having a different phase response;
a multiplexer configured to switch between respective first filtered signals for output based on the tuning signal.

8. The apparatus of claim 7, wherein during switching between respective first filtered signals the multiplexer is configured to output a weighted combination of two or more of the respective first filtered signals.

9. The apparatus of claim 7, wherein the multiplexer is configured to switch between respective first filtered signals for output during a zero-crossing point of the input signal or during a period in which the input signal is below a signal threshold or wherein the period during which the multiplexer is configured to switch between respective first filtered signals is chosen to psychoacoustically mask the switching.

10. The apparatus of claim 1, wherein the first filter module comprises:
a pre filter for generating a pre-filtered signal, wherein the plurality of first filters are configured to generate the respective first filtered signals based on the pre-filtered signal.

11. The apparatus of claim 10, wherein the pre-filter comprises a minimum phase filter.

12. The apparatus of claim 10, wherein the plurality of first filters each comprise an all-pass filter having a different phase response.

13. The apparatus of claim 1, wherein the first filter module comprises:
a first filter for generating a first filtered signal;
a second filter for filtering the first filtered signal to generate a second filtered signal,
wherein a response of the second filter is dependent on the tuning signal.

14. The apparatus of claim 13, wherein the second filter is an all-pass filter.

15. The apparatus of claim 13, wherein the second filter is adjustable between minimum phase and linear phase based on the tuning signal.

16. The apparatus of claim 13, wherein an impulse peak in a response of the second filter is substantially independent of the tuning signal, and wherein pre-ringing and post-ringing of the second filter vary in dependence on the tuning signal.

17. The apparatus of claim 13, wherein delay, pre-ringing and post ringing of the second filter vary in dependence on the tuning signal.

18. The apparatus of claim 1, further comprising:
a tuning module configured to adapt the first filter module.

19. The apparatus of claim 18, wherein the tuning module is configured to adapt the first filter module by adapting the tuning signal.

20. The apparatus of claim 18, wherein the tuning module is configured to adapt the first filter module based on a characteristic of an audio system comprising the apparatus, wherein the characteristic of the audio system comprises one of:
a type of audio output device comprised in the audio system;
a type of amplifier comprised in the audio system.

21. An integrated circuit comprising the apparatus of claim 1.

22. The integrated circuit of claim 21, wherein the tuning input is coupled to a plurality of pins of the integrated circuit.

23. An audio playback device comprising the apparatus of claim 1.

24. The audio device of claim 23, wherein the audio playback device comprises a high fidelity (Hi-Fi) stereo system.

25. An audio playback device, comprising:
an audio input for receiving an input audio signal from an audio source;
an tuning input for receiving a tuning signal configurable by a user of the audio playback device;
an audio output for delivering a filtered audio signal to an audio output device;
a filter chain comprising a plurality of filters for filtering the input audio signal to produce the filtered audio signal, the filter chain comprising:
a first filter module operating at a first sampling rate; and
a second filter module operating at a second sampling rate greater than the first sampling rate,
wherein a phase response of the first filter module is dependent on the tuning input and wherein a magnitude response of the first filter module is substantially independent of the tuning input.

* * * * *